(12) United States Patent
Koike et al.

(10) Patent No.: US 8,810,505 B2
(45) Date of Patent: Aug. 19, 2014

(54) DISPLAY DEVICE AND DISPLAY METHOD (75) Inventors: Akira Koike, Osaka (JP); Masahiko Takiguchi, Osaka (JP); Mihoko Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/700,063

(22) PCT Filed: May 27, 2011

(86) PCT No.: PCT/JP2011/062294
§ 371 (c)(1),
(2), (4) Date: Nov. 26, 2012

(87) PCT Pub. No.: WO2011/149094
PCT Pub. Date: Dec. 1, 2011

(65) Prior Publication Data
US 2013/0069857 A1  Mar. 21, 2013

(30) Foreign Application Priority Data

May 28, 2010 (JP) .................................. 2010-123467
Nov. 4, 2010 (JP) .................................. 2010-247940

(51) Int. Cl.
*G09G 3/34* (2006.01)
*G09G 3/36* (2006.01)
*H04N 5/66* (2006.01)
*G02F 1/1335* (2006.01)

(52) U.S. Cl.
CPC .......... *G09G 3/36* (2013.01); *G09G 2310/0229* (2013.01); *G09G 2310/08* (2013.01); *G09G 2320/062* (2013.01); *G09G 2320/0606* (2013.01); *G09G 3/3406* (2013.01); *H04N 5/66* (2013.01); *G09G 3/342* (2013.01); *G09G 2340/0435* (2013.01); *G09G 2310/024* (2013.01); *G02F 1/1336* (2013.01)
USPC ................ 345/102; 345/87; 345/89; 345/103

(58) Field of Classification Search
CPC ............ G09G 3/342; G09G 2310/024; G09G 2320/0261; G09G 3/3406; G09G 2320/0247; G09G 2360/16; G09G 2320/064
See application file for complete search history.

(56) References Cited

U.S. PATENT DOCUMENTS 5,173,793 A * 12/1992 Purcell .......................... 345/173
2002/0003522 A1 * 1/2002 Baba et al. ...................... 345/89

(Continued)

FOREIGN PATENT DOCUMENTS

| CN | 101551978 A | 10/2009 |
| JP | 2004-56287 A | 2/2004 |

(Continued)

OTHER PUBLICATIONS

Japanese Office Action (Notification of Reasons for Refusal) mailed Jun. 26, 2012 for Application No. 2010-247940.

*Primary Examiner* — Jesus Hernandez
(74) *Attorney, Agent, or Firm* — Birch, Stewart, Kolasch & Birch, LLP (57) ABSTRACT

A liquid crystal television (1) includes a backlight (110a) which emits light toward an outside of the liquid crystal television (1) so that an image is displayed on a liquid crystal panel (110b) and a backlight control circuit (110c) which controls whether or not the backlight (110a) emits light. The backlight control circuit (110c) carries out control with respect to backlight (110a) so that a light-emitting period in which the backlight (110a) emits light alternates with a non-light-emitting period in which the backlight (110a) does not emit light.

18 Claims, 6 Drawing Sheets

(56) References Cited

U.S. PATENT DOCUMENTS

| | | | |
|---|---|---|---|
| 2002/0057241 A1* | 5/2002 | Oda et al. | 345/87 |
| 2005/0146532 A1 | 7/2005 | Miyazaki et al. | |
| 2006/0082538 A1* | 4/2006 | Oyama | 345/102 |
| 2006/0164380 A1* | 7/2006 | Yang et al. | 345/103 |
| 2008/0180385 A1* | 7/2008 | Yoshida et al. | 345/102 |
| 2008/0186413 A1 | 8/2008 | Someya et al. | |
| 2008/0309811 A1* | 12/2008 | Fujinawa et al. | 348/333.01 |
| 2009/0243995 A1 | 10/2009 | Kimura | |
| 2009/0310018 A1 | 12/2009 | Sakashita et al. | |
| 2010/0134402 A1 | 6/2010 | Groot Hulze | |
| 2010/0156964 A1* | 6/2010 | Masuda et al. | 345/691 |
| 2010/0194271 A1 | 8/2010 | Tomiyoshi | |
| 2011/0013098 A1* | 1/2011 | Jung et al. | 348/790 |

FOREIGN PATENT DOCUMENTS

| | | |
|---|---|---|
| JP | 2005-195734 A | 7/2005 |
| JP | 2008-79287 A | 4/2008 |
| JP | 2008-193285 A | 8/2008 |
| JP | 2008-197425 A | 8/2008 |
| JP | 2008-536164 A | 9/2008 |
| JP | 2009-169196 A | 7/2009 |
| JP | 2009-224884 A1 | 10/2009 |
| JP | 2009-296081 A | 12/2009 |
| JP | 2009-300785 A | 12/2009 |
| JP | 2010-113072 A | 5/2010 |
| WO | WO 2007032124 A1 * | 3/2007 |
| WO | WO 2009/016852 A1 | 2/2009 |

* cited by examiner

DISPLAY DEVICE AND DISPLAY METHOD

TECHNICAL FIELD

The present invention relates to a display device which displays an image and a display method used in the display device.

BACKGROUND ART

Movies in a DVD format, a BD format, and the like have been on the market in recent years. Accordingly, there has been increasing opportunities for people to watch a movie on a liquid crystal television, a plasma television, or the like at home.

DVD, BD, and the like are high in the number of recording pixels. A liquid crystal television, a plasma television, and the like are in general capable of displaying a high-definition image compared with a cathode-ray tube television.

As described in Patent Literature 1, many liquid crystal televisions which are on the market these days support input of an image at 1080/24p.

In a case where an image at 1080/24p is inputted from a BD player or the like, it is possible for a liquid crystal television which supports input of an image at 1080/24p to display a 24p image by 48 Hz drive or 120 Hz drive without carrying out a pull-down processing. This makes it possible to more faithfully reproduce a feel of an image of a movie seen in a movie theater as compared with a conventional liquid crystal television.

Patent literatures 1 and 2 disclose other techniques for allowing a user to watch a movie in higher definition.

Movies in a DVD format, a BD format, and the like include not only recent movies but also old famous movies such as "The Wonderful Wizard of Oz", "Gone with the Wind", and "An American in Paris".

Since these famous movies were shot by use of an old-fashioned shooting technique and screened by use of an old-fashioned screening technique, unique definition which is different from a definition of a recent digital image, noise, and a flicker occurred on a projected image. In general, such noise and a flicker have a harmful effect on image quality. However, when movie fans who love old famous movies watch such an old famous movie, some of the movies fans want to enjoy not a high-definition image but an atmosphere of a then image which has unique noise and a flicker.

CITATION LIST

Patent Literatures

Patent Literature 1
Japanese Patent Application Publication, Tokukai, No. 2009-300785 (Publication Date: Dec. 24, 2009)
Patent Literature 2
Japanese Patent Application Publication, Tokukai, No. 2008-79287 (Publication Date: Apr. 3, 2008)

SUMMARY OF INVENTION

Technical Problem

The conventional arrangement employs various techniques for improving image quality such as a local dimming technique and a noise reduction technique for reducing noise. In a case where an old famous movie is displayed according to the conventional arrangement, such various techniques work adversely and prohibit a feel of a then image from being faithfully conveyed to a viewer.

The present invention has been made in view of the problem, and a main object of the present invention is to provide a display device which is capable of reproducing an atmosphere created by an image of an old famous movie more faithfully than a conventional liquid crystal television, a conventional plasma television, and the like.

Solution to Problem

In order to attain the object, a display device according to the present invention which displays, on a display surface, an image of n frames per second, the display device includes: a light source section which emits light toward an outside of the display device so that the image is displayed on the display surface; and a light source control section which controls whether or not the light source section emits light, the light source control section carrying out control with respect to the light source section so that a light-emitting period in which the light source section emits light alternates with a non-light-emitting period in which the light source section does not emit light, the light-emitting period and the non-light-emitting period each being $1 \div (m \times n)$ second (m is an integer not less than 2).

Therefore, the display device yields an effect of reproducing an atmosphere created by an image of an old famous movie more faithfully than a conventional liquid crystal television and a conventional plasma television.

In order to attain the object, a display method for a display device in accordance with the present invention which displays, on a display surface, an image of n frames per second, the display method includes the steps of: (a) causing a light source section to emit light toward an outside of the display device so that the image is displayed on the display surface; and (b) causing a light source control section to control whether or not the light source section emits light, in the step (b), the light source control section carrying out control with respect to the light source section so that a light-emitting period in which the light source section emits light alternates with a non-light-emitting period in which the light source section does not emit light, the light-emitting period and the non-light-emitting period each being $1 \div (m \times n)$ second (m is an integer not less than 2).

According to the arrangement, the display method in accordance with the present invention yields the same operation effect as the display device in accordance with the present invention.

Advantageous Effects of Invention

As described above, the display device in accordance with the present invention is capable of reproducing an atmosphere created by an image of an old famous movie more faithfully than a conventional liquid crystal television and a conventional plasma television.

BRIEF DESCRIPTION OF DRAWINGS

FIG. 3 shows timings of turning on and off backlight in a movie (classic) mode. (a) of FIG. 3 shows a case where a 24p input image is displayed by a four-speed drive. (b) of FIG. 3 shows a case where a 60p input image is displayed by a scan double-speed drive.

(a) to (d) of FIG. 4 show an example of a menu screen on which lighting frequency of a backlight is adjusted in the movie (classic) mode.

DESCRIPTION OF EMBODIMENT

The following description discusses an embodiment of the present invention with reference to drawings. Note that the following description takes, as an example of a display device, a television receiver which includes a liquid crystal display (hereinafter, referred to as a "liquid crystal television"). However, the present invention is not limited to this. That is, the liquid crystal television is merely one example of a device which functions as a display device, and can be replaced with other devices such as a plasma television, a video projector, a CRT, and a liquid crystal display monitor.

A liquid crystal television in accordance with the present embodiment has not only image quality adjustment modes such as a game mode and a normal movie mode, but also a movie (classic) mode as an unconventional image quality adjustment mode. The movie (classic) mode is an image quality adjustment mode which makes it possible to display an old famous movie with such an image quality (predetermined image quality) that aforementioned unique definition, noise and a flicker are reproduced as faithfully as possible.

[Arrangement of Liquid Crystal Television]

Figure 1:
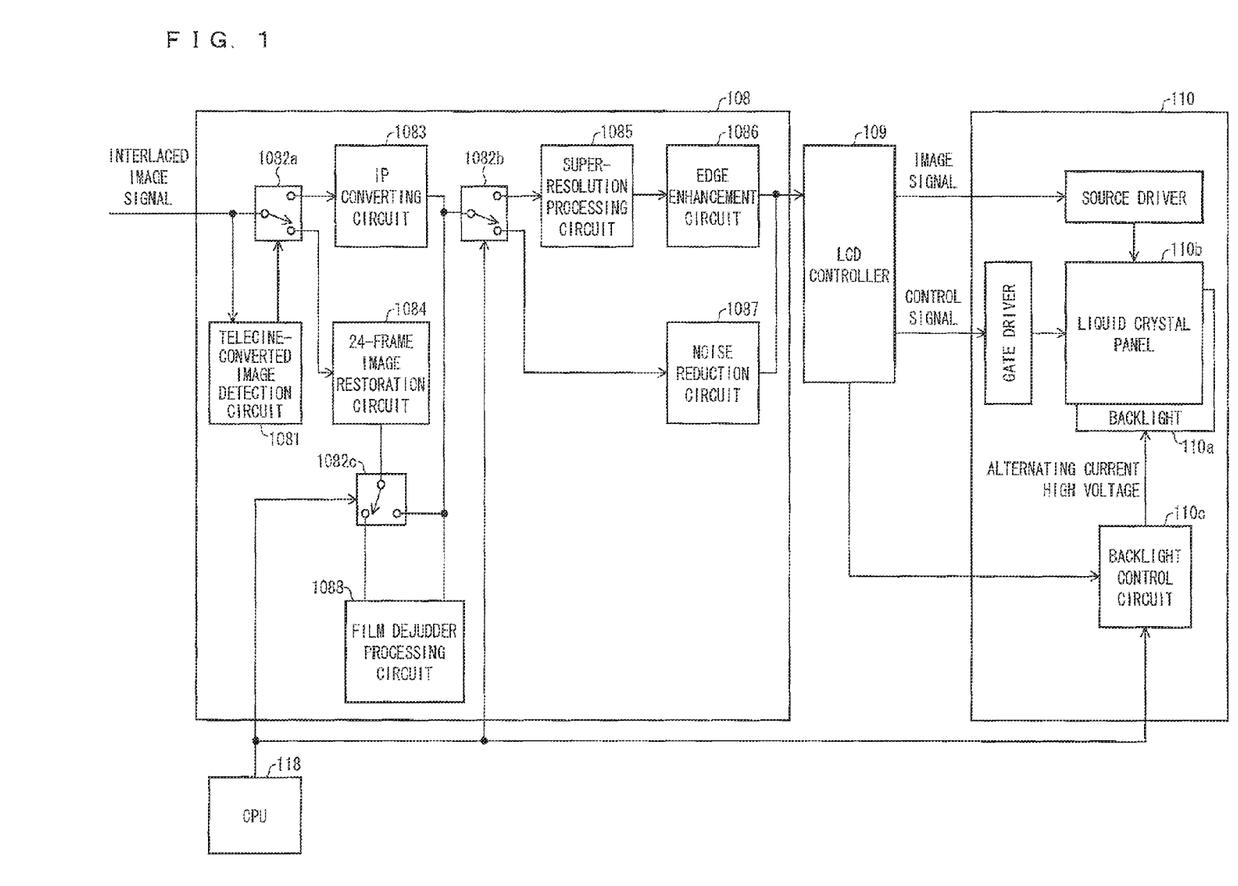
FIG. 1 is a block diagram showing an arrangement of a part of a liquid crystal television in detail (especially, an image processing circuit and a LCD) in accordance with an embodiment of the present invention.
Figure 2:
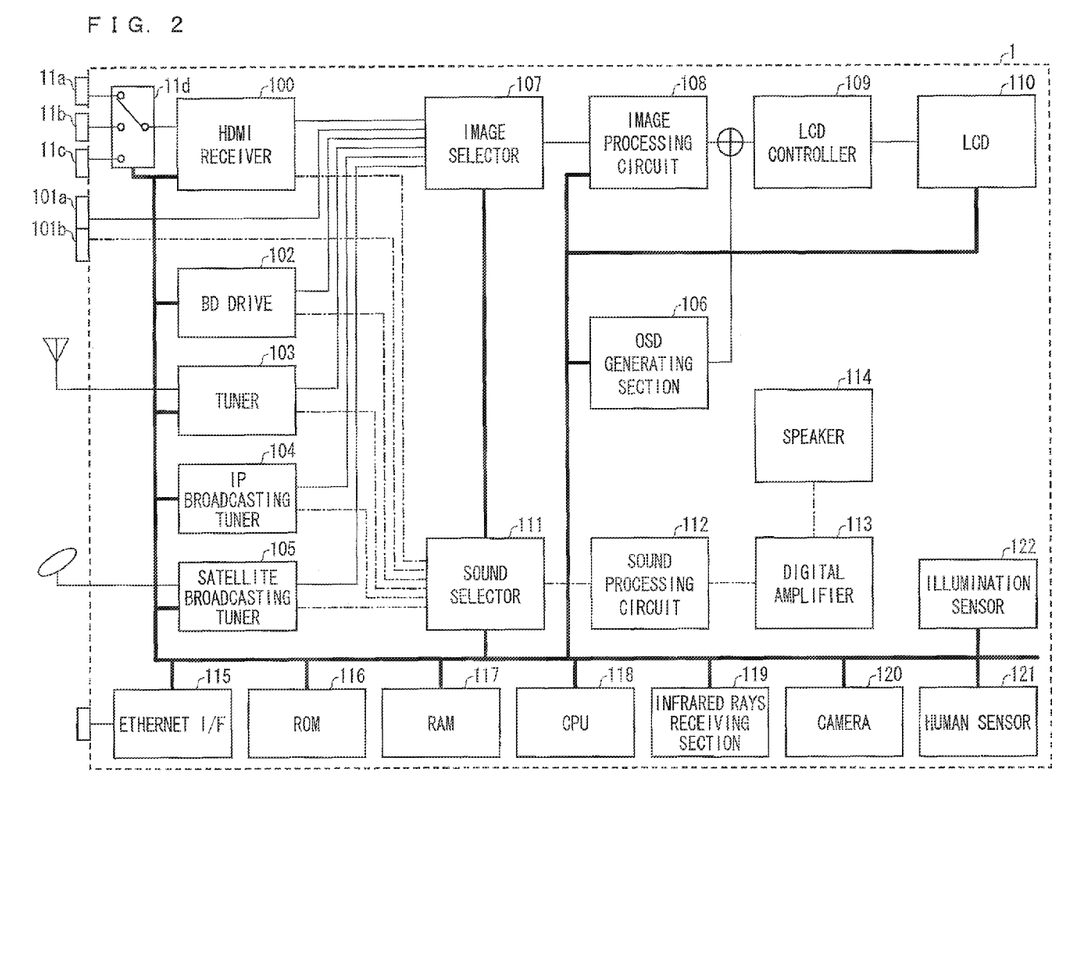
FIG. 2 is a block diagram showing an arrangement of the liquid crystal television in accordance with the embodiment of the present invention.

The following description discusses an arrangement of a liquid crystal television 1 with reference to FIGS. 1 and 2. FIG. 2 shows an arrangement of the liquid crystal television 1. FIG. 1 mainly shows an arrangement of a part of the television 1 in detail (especially, an image processing circuit 108 and an LCD 110).

The television 1 includes three HDMI input terminals 11a to 11c, an HDMI switch 11d, an HDMI receiver 100, an image input terminal 101a, a sound input terminal 101b, a BD drive 102, a tuner 103, an IP broadcasting tuner 104, a satellite broadcasting tuner 105, an OSD generating section 106, an image selector 107, an image processing circuit 108, an LCD controller 109, an LCD (Liquid Crystal Display) 110, a sound selector 111, a sound processing circuit 112, a digital amplifier 113, a speaker 114, an Ethernet I/F 115, a ROM 116, a RAM 117, a CPU 118, an infrared rays receiving section 119, a camera 120, a human sensor 121, and an illumination sensor 122 (see FIG. 2). In FIG. 2, the solid line indicates a path of an image signal, the dashed-dotted line indicates a path of a sound signal, and the thick line indicates a path (bus) of data and a control signal.

Each of (1) an image received by the HDMI receiver 100, (2) an image inputted from the image input terminal 101a, (3) an image read by the BD drive 102 from a BD (Blu-ray Disc) (4) an image received by the (digital terrestrial broadcasting) tuner 103, (5) an image received by the IP broadcasting tuner 104, and (6) an image received by the satellite broadcasting tuner 105 is supplied to the image selector 107. Each of (1) a sound received by the HDMI receiver 100, (2) a sound inputted from the sound input terminal 101b, (3) a sound read by the BD drive 102 from a BD, (4) a sound received by the tuner 103, (5) a sound received by the IP broadcasting tuner 104, and (6) a sound received by the satellite broadcasting tuner 105 is supplied to the sound selector 111.

Note that the CPU 118 controls selection as to (a) from which one of the HDMI input terminals the HDMI receiver 101 receives content, that is, from which one of the HDMI input terminals the HDMI switch 11d supplies content to the HDMI receiver 100, (b) content transmitted through which channel the tuner 103 is to receive, (c) content delivered by which server the IP broadcast tuner 104 is to receive, and (d) content transmitted through which channel the satellite broadcasting tuner 105 is to receive. The CPU 118 also controls (e) reproduction such as playback, suspension, fast-playback, rewinding, and chapter transit in the BD drive 102.

The image selector 107 selects one image from (1) the image which has been supplied from the HDMI receiver 100, (2) the image which has been supplied from the image input terminal 101a, (3) the image which has been supplied from the BD drive 102, (4) the image which has been supplied from the tuner 103, (5) the image which has been supplied from the IP broadcasting tuner 104, and (6) the image which has been supplied from the satellite broadcasting tuner 105. The image which has been selected by the image selector 107 is supplied to the image processing circuit 108. Note that the CPU 118 controls the image selector 107 as to which image the image selector 107 selects.

The image processing circuit 108 adjusts image quality of the image which has been supplied from the image selector 107. The image processing circuit 108 also carries out scaling of the image which has been supplied from the image selector 107. The adjustment of image quality here means changing at least one of, for example, luminance, sharpness, and contrast. The scaling means reducing a size of an image to be displayed while maintaining an original aspect ratio of the image. The image which has been subjected to the image quality adjustment and the scaling by the image processing circuit 108 is supplied to the LCD controller 109. Note that the CPU 118 controls the image processing circuit 108 as to how the image processing circuit 108 changes image quality and as to how much the image processing circuit 108 reduces the size of the image.

The LCD controller 109 drives the LCD 110 to display the image which has been supplied from the image processing circuit 108. The image which has been selected by the image selector 107 is thus outputted from the LCD 110. Note that, in a case where an OSD image is supplied from the OSD generating section 106, the LCD controller 109 causes the LCD 110 to display the OSD image supplied from the OSD generating section 106 and the image which has been supplied from the image processing circuit 108 in such a manner that they overlap each other. The LCD controller 109 also notifies a backlight control circuit 110c of how many frames per second an image signal inputted from the previous stage has.

The sound selector 111 selects one sound from the sound which has been supplied from the HDMI receiver 100, the sound which has been supplied from the image input terminal 101a, the sound which has been supplied from the BD drive 102, the sound which has been supplied from the tuner 103, the sound which has been supplied from the IP broadcasting tuner 104, and the sound which has been supplied from the satellite broadcasting tuner 105. The sound which has been selected by the sound selector 111 is supplied to the sound processing circuit 112. Note that the CPU 118 control the sound selector 111 as to which sound the sound selector 117 selects. Note that selection of an image in the image selector 107 and selection of a sound in the sound selector 111 are linked each other. For example, in a case where the image selector 107 selects an image which has been supplied from the HDMI receiver 100, the sound selector 111 also selects a sound which has been supplied from the HDMI receiver 100.

The sound processing circuit 112 adjusts sound volume and sound quality of the sound which has been supplied from the sound selector 111. The adjustment of sound quality here means changing frequency characteristic of the sound which has been supplied from the sound selector 111 (for example, emphasizing low pitch and emphasizing high pitch). The sound which has been subjected to the adjustment of sound volume and sound quality by the sound processing circuit 112 is supplied to the digital amplifier 113. Note that the CPU 118 controls the sound processing circuit 112 as to how the sound processing circuit 112 changes sound volume and sound quality.

The digital amplifier 113 drives the speaker 114 to output the sound which has been supplied from the sound processing circuit 112. The sound which has been selected by the sound selector 111 is thus outputted from the speaker 114.

The CPU 118 controls each of the sections in accordance with a remote control signal which is received by the infrared rays receiving section 119, an image which is captured by the camera 120, a sensor signal which is outputted by the human sensor 121, and a sensor signal which is outputted from the illumination sensor 122. The sensor signal which is outputted by the human sensor 121 is a binary signal indicative of whether or not a viewer exists within a sensing coverage of the human sensor 121. The sensor signal which is outputted from the illumination sensor 122 is a multivalued signal indicative of illumination (brightness) of surroundings of the illumination sensor 122. Control by use of the infrared rays receiving section 119 is exemplified by (i) control of switching an image quality adjustment mode in accordance with a remote control signal (image quality setting instruction), (ii) control of switching, in accordance with a remote control signal, a channel which is selected by the tuner 104, and (iii) control of switching, in accordance with a remote control signal, an image which is selected by the image selector 107 and a sound which is selected by the sound selector 111. Control by use of the camera 120 is exemplified by control of switching the way in which the image processing circuit 108 adjusts image quality in accordance with a viewer who is identified based on a captured image. Control by use of the human sensor 121 is exemplified by control of switching whether the backlight of the LCD 110 is turned on or turned off in accordance with a sensing result.

The CPU 118 is arranged to supply a control signal to the image processing circuit 108 and to the LCD 110 while the image quality adjustment mode is the movie (classic) mode.

The ROM 116 is a readable and unrewritable memory which stores fixed data such as a program executed by the CPU 118. The ROM 116 also stores JPEG data and SVG (Scalable Vector Graphics) data each of which is referred to for the purpose of generation of an ODS image by the OSD generating section 106. Meanwhile, the RAM 117 is a readable and rewritable memory which stores variable data such as data which is referred to for the purpose of an arithmetical operation by the CPU 118 and data which is generated by the CPU 118 as a result of the arithmetical operation.

The Ethernet I/F 115 is an interface for connecting the television 1 to a network. The IP broadcasting tuner 105 accesses a server on the Internet via the Ethernet I/F 115.

(Arrangement of the Image Processing Circuit 108)

The image processing circuit 108 includes a telecine-converted image detection circuit 1081, switching circuits 1082a to 1082c, an IP converting circuit 1083, a 24-frame image restoration circuit 1084, a super-resolution processing circuit 1085, an edge enhancement circuit 1086, a noise reduction circuit 1087, and a film dejudder processing circuit 1088.

The telecine-converted image detection circuit 1081 detects whether or not a signal which has been supplied to the image processing circuit 108 is an interlaced image signal which has been subjected to a telecine conversion.

The IP converting circuit 1083 converts the interlaced image signal into a progressive image signal.

The 24-frame image restoration circuit 1084 reconstructs a 24-frame image signal by carrying out a conversion reverse to a telecine conversion.

The super-resolution processing circuit 1085 subjects an inputted image signal to a super-resolution process. The image which has been subjected to the super-resolution process has higher resolution than an image which has not been subjected to the super-resolution process.

The edge enhancement circuit 1086 subjects an inputted image signal to an edge enhancement process. In the image which has been subjected to the edge enhancement process, an object is more sharply outlined as compared with an image which is displayed without being subjected to the edge enhancement process.

The noise reduction circuit 1087 subjects an image signal to a noise reduction process. In the image which has been subjected to the noise reduction process, a noise such as a grain noise is less distinct as compared with an image which is displayed without being subjected to the noise reduction process.

The film dejudder processing circuit 1088 generates an image signal of an interpolation frame by detecting motion vectors from an inputted 24-frame image signal. The film dejudder processing circuit 1088 then interleaves the inputted 24-frame image signal with the image signal of the interpolation frame so as to convert the inputted 24-frame image signal into a 60 frame image signal.

Each of the switching circuits 1082a to 1082c includes two output sections for outputting a signal. Each of the switching circuits 1082a to 1082c switches, in accordance with whether or not a control signal is supplied from outside, from which one of the two output sections an inputted signal is outputted.

Specifically, in a case where the telecine-converted image detection circuit 1081 detects a 60i image signal which has been subjected to a telecine conversion and then transmits a control signal to the switching circuit 1082a, the switching circuit 1082a switches to one of the two output sections which one allows a signal to be supplied to the 24-frame image restoration circuit 1084. On the other hand, in a case where the telecine-converted image detection circuit 1081 does not detect a 60i image signal which has been subjected to a telecine conversion (i.e., a control signal is not transmitted to the switching circuit 1082a), the switching circuit 1082a switches to the other one of the two output sections which other one allows a signal to be supplied to the IP converting circuit 1083.

(LCD 110)

The LCD 110 includes a backlight 110a, a liquid crystal panel 110b, and a backlight control circuit 110c.

The backlight 110a is a direct LED backlight which emits backlight toward the liquid crystal panel 110b.

The backlight which has been transmitted through a liquid crystal of the liquid crystal panel 110b allows the liquid crystal panel 110b to displays an image. How much backlight is transmitted is controlled by voltages for driving a gate driver and a source driver.

The backlight control circuit 110c controls the backlight 110a to turn on and off.

(Operation of the Liquid Crystal Television 1)

The following describes operation of the liquid crystal television 1 in accordance with the present embodiment which operation is carried out by the image processing circuit 108, the LCD controller 109, and the LCD 110 with reference to FIG. 1. Note that the following describes (i) operation of the liquid crystal television 1 carried out in a case where an interlaced image signal which has been subjected to a telecine conversion is inputted to the image processing circuit 108 in the movie (classic) mode and (ii) operation of the liquid crystal television 1 carried out in a case where an interlaced image signal which has been subjected to a telecine conversion is inputted to the image processing circuit 108 in another image quality adjustment mode.

(Operation in a Case of the Movie (Classic) Mode)

As described earlier, the CPU 118 is arranged to supply a control signal to the image processing circuit 108 and to the LCD 110 while the image quality adjustment mode is the movie (classic) mode. Specifically, the control signal is supplied to the switching circuits 1082b and 1082c of the image processing circuit 108 and the backlight control circuit 110c of the LCD 110.

Upon receipt of the control signal, the switching circuit 1082b switches a destination of a progressive image signal to the super-resolution processing circuit 1085. Similarly, upon receipt of the control signal, the switching circuit 1082c switches a destination of a progressive image signal to the switching circuit 1082b.

The backlight control circuit 110c controls the backlight 110a to keep emitting light. However, while a control signal is being inputted, the backlight control circuit 110c controls the backlight 110a to repeat turning on and off.

More specifically, the backlight control circuit 110c carries out control with respect to the backlight 110a so that a light-emitting period in which the backlight 110a emits light alternates with a non-light-emitting period in which the backlight 110a does not emit light. The length of the light-emitting period and the length of the non-light-emitting period depend on how many frames per second an image to be displayed on the LCD 110 has. That is, the length of the light-emitting period and the length of the non-light-emitting period are determined in accordance with information indicative of how many frames per second an image signal has, the information having been inputted from the LCD controller 109.

Figure 3:
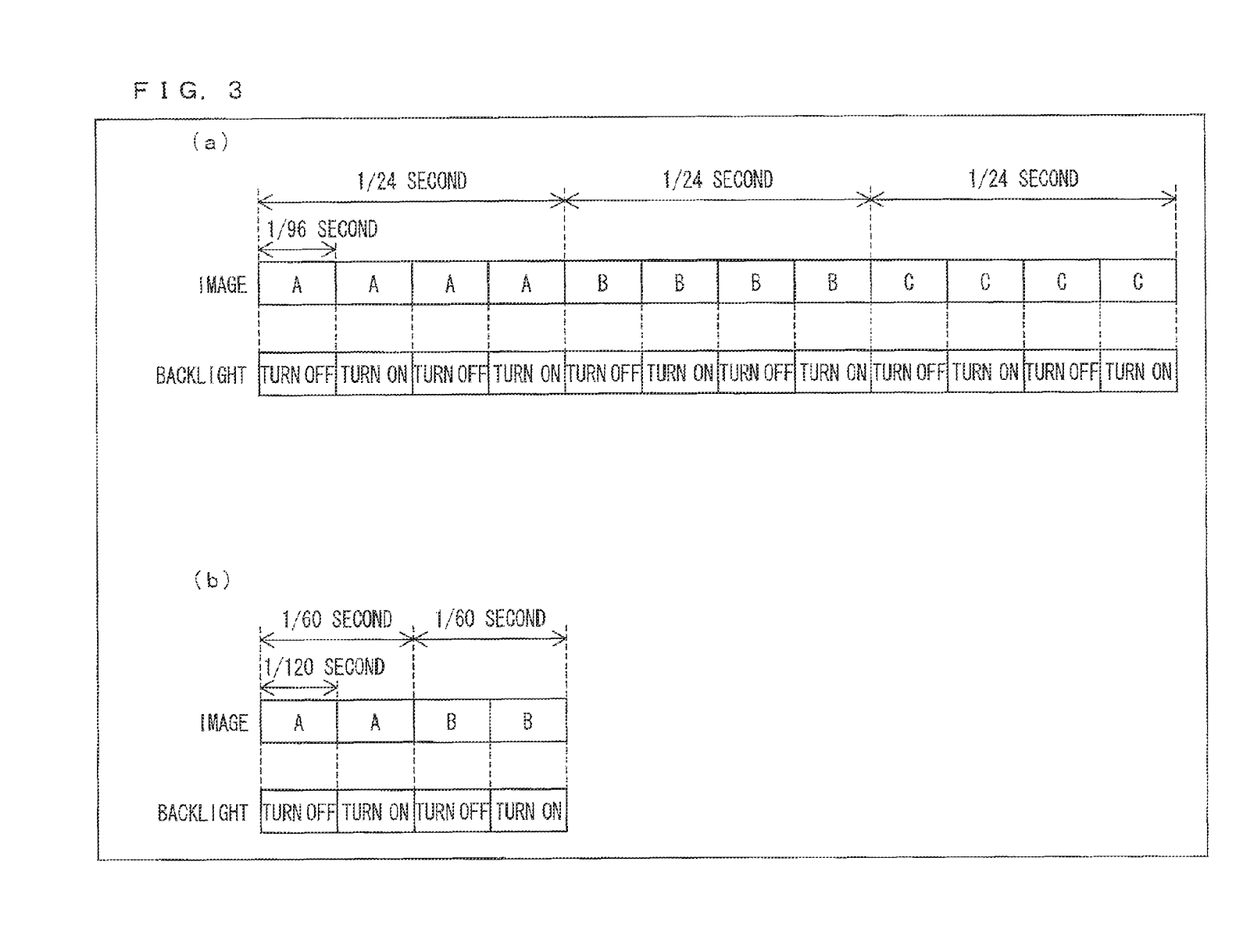

The following describes, with reference to FIG. 3, how the backlight control circuit 110c controls the backlight 110a (i) in a case where an image signal of 24 frames per second is inputted and (ii) in a case where an image signal of 60 frames per second is inputted. FIG. 3 shows timings of turning on and turning off the backlight in the movie (classic) mode. (a) of FIG. 3 shows a case where an image of 24 frames per second is displayed. (b) of FIG. 3 shows a case where an image of 60 frames per second is displayed. In (a) of FIG. 3, four "A"s constitute one (I) frame (frame A) (the same applies to B and C), whereas, in (b) of FIG. 3, two "A"s constitute one (I) frame (frame A) (the same applies to B).

In a case where an image signal of 24 frames per second is inputted, the backlight control circuit 110c is arranged to set a light-emitting period and a non-light-emitting period to 1/96 second (see (a) of FIG. 3). In this case, a black image is inserted twice while one (I) frame image is being displayed. In a case where an image signal of 60 frames per second is inputted, the backlight control circuit 110c is arranged to set a light-emitting period and a non-light-emitting period to 1/120 second (see (b) of FIG. 3).

Note that a light-emitting period and a non-light-emitting period are not limited to the specific numerical values. For example, it is only necessary that the light-emitting period and the non-light-emitting period be set to 1÷(m×n) second (n: the number of frames per second, m: any integer which is not less than 2). Note that an intermittent cycle in which the backlight control circuit 110c controls the backlight 110a to alternately turn on and off has a physical lowest limit corresponding to a capacity of the backlight control circuit 110c. That is, the integer m has an upper limit which depends on the lowest limit of the intermittent cycle.

In the movie (classic) mode, in a case where a telecine-converted interlaced image signal is supplied to the image processing circuit 108, the interlaced image signal is supplied to the switching circuit 1082a and the telecine-converted image detection circuit 1081.

The telecine-converted image detection circuit 1081 detects the supply of the telecine-converted interlaced image signal, and then supplies a control signal to the switching circuit 1082a.

Upon receipt of the control signal, the switching circuit 1082a supplies, to the 24-frame image restoration circuit 1084, the interlaced image signal as it is.

The 24-frame image restoration circuit 1084 converts the telecine-converted interlaced image signal into a 24-frame progressive image signal, and then supplies the 24 frame progressive image signal to the switching circuit 1082c.

The switching circuit 1082c supplies, to the switching circuit 1082b, the 24-frame progressive image signal as it is. The switching circuit 1082b supplies, to the super-resolution processing circuit 1085, the 24-frame progressive image signal as it is.

The super-resolution processing circuit 1085 subjects the progressive image signal to a super resolution process, and then supplies it to the edge enhancement circuit 1086. The edge enhancement circuit 1086 subjects, to an edge enhancement process, the progressive image signal which has been supplied from the super-resolution processing circuit 1085, and then supplies it to the LCD controller 109.

The LCD controller 109 respectively supplies, to the source driver and the gate driver, an image signal and a control signal each of which corresponds to the progressive image signal supplied from the edge enhancement circuit 1086. The source driver and the gate driver apply a driving voltage corresponding to the image signal and a driving voltage corresponding to the control signal, respectively, so as to control orientation of liquid crystal molecules in the liquid crystal layer of the liquid crystal panel 110b. Backlight emitted from the backlight 110a which backlight has transmitted through the liquid crystal layer allows the liquid crystal panel 110b to display an image which has been subjected to the image processing by the image processing circuit 108.

The operations of the liquid crystal television 1 in the movie (classic) mode have been discussed above. Note, however, that it is also possible to employ another arrangement in which the liquid crystal television 1 is arranged such that the switching circuit 1082c outputs a signal to the film dejudder processing circuit 1088 not only in a case where a control signal is not supplied to the switching circuit 1082c but also in a case where a control signal is supplied to the switching circuit 1082c (that is, the switching circuit 1082c outputs a signal to the film dejudder processing circuit 1088 at all times).

(Operations in a Case of Another Image Quality Adjustment Mode)

The following description discusses operations carried out in a case where an image quality adjustment mode other than the movie (classic) mode is set. It is assumed here that a normal movie mode is set.

When input of a control signal ceases, the switching circuit 1082b switches a destination of a progressive image signal to the noise reduction circuit 1087. Similarly, when input of a control signal ceases, the switching circuit 1082c switches a destination of a progressive image signal to the film dejudder processing circuit 1088.

The backlight control circuit 110c is arranged to control the backlight 110a to keep turning on at all times.

Also in the normal movie mode, in a case where a telecine-converted interlaced image signal is supplied to the image processing circuit 108, the telecine-converted interlaced image signal is supplied to the switching circuit 1082a and the telecine-converted image detection circuit 1081.

The telecine-converted image detection circuit 1081 detects supply of the telecine-converted interlaced image signal, and then supplies a control signal to the switching circuit 1082a.

Upon receipt of the control signal, the switching circuit 1082a supplies, to the 24-frame image restoration circuit 1084, the interlaced image signal as it is.

The 24-frame image restoration circuit 1084 converts the telecine-converted interlaced image signal into a 24-frame progressive image signal, and then supplies the 24-frame progressive image signal to the switching circuit 1082c.

The switching circuit 1082c supplies, to the film dejudder processing circuit 1088, the 24-frame progressive image signal as it is.

The film dejudder processing circuit 1088 subjects the 24-frame progressive image signal to a film dejudder process, and then supplies it to the switching circuit 1082b. The image which has been subjected to the film dejudder process can be a 60-frame image or can be a 120-frame image. The switching circuit 1082b supplies, to the noise reduction circuit 1087 as it is, the progressive image signal which has been supplied from the film dejudder processing circuit 1088.

The noise reduction circuit 1087 subjects, to a noise reduction process, the progressive image signal which has been supplied from the switching circuit 1082b, and then supplies it to the LCD controller 109.

The LCD controller 109 respectively supplies, to the source driver and the gate driver, an image signal and a control signal each of which corresponds to the progressive image signal supplied from the edge enhancement circuit 1086. The source driver and the gate driver apply a driving voltage corresponding to the image signal and a driving voltage corresponding to the control signal, respectively, so as to control orientation of liquid crystal molecules in the liquid crystal layer of the liquid crystal panel 110b. Backlight emitted from the backlight 110a which backlight has transmitted through the liquid crystal layer allows the liquid crystal panel 110b to display an image which has been subjected to the image processing by the image processing circuit 108.

(Image Adjustment Function in Movie (Classic) Mode)

According to the liquid crystal television 1, in the movie (classic) mode, an intermittent cycle in which the backlight control circuit 110c controls the backlight 110a to alternately turn on and off is adjusted in accordance with an operation of a slide bar for a shutter effect adjustment which slide bar is included in a user interface (UI) displayed, by use of an OSD function, on the liquid crystal panel 110b.

The following description discusses Specific Examples 1 and 2 of the user interface.

Specific Example 1

Figure 4:
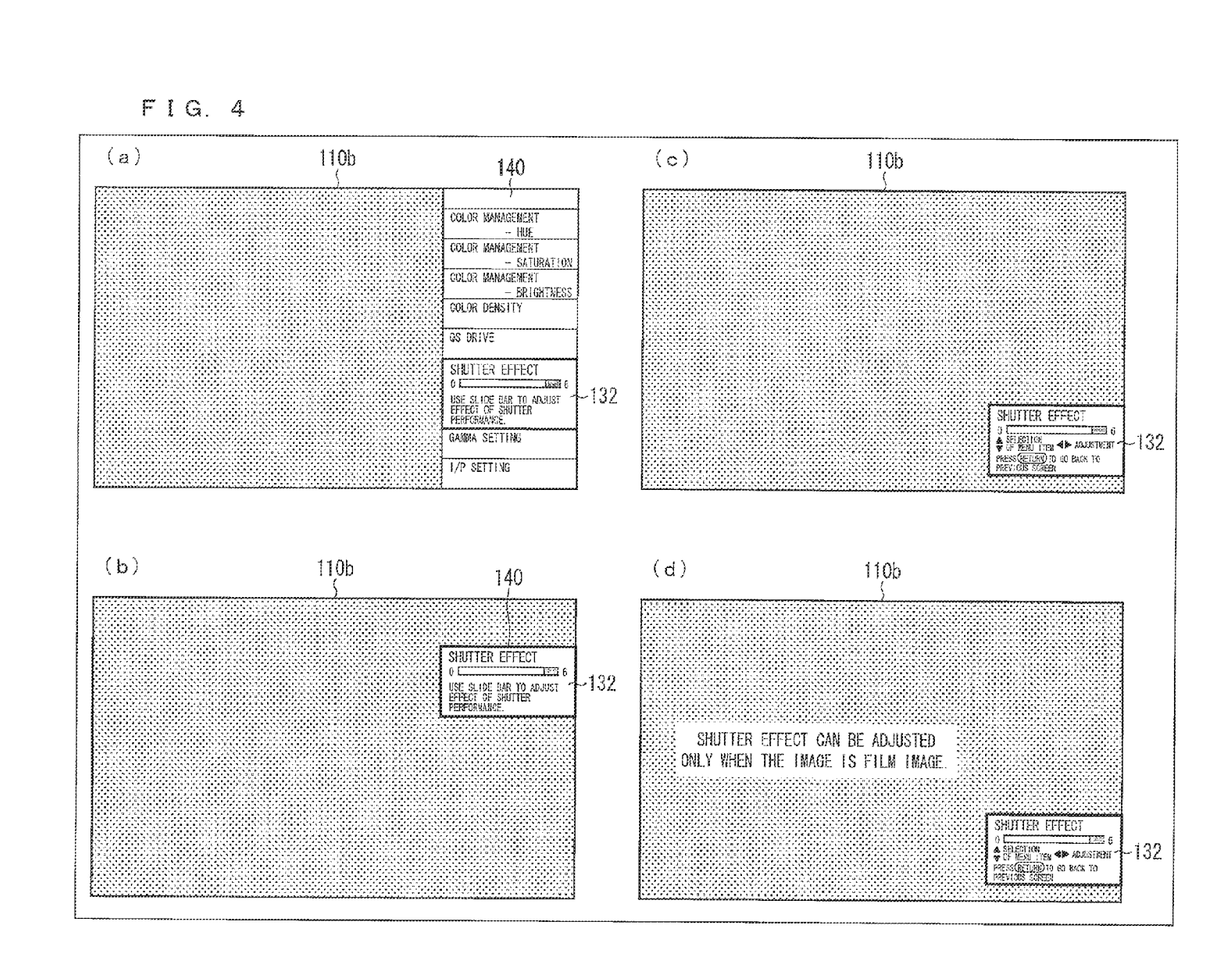

Firstly, the following description discusses Specific Example 1 of the user interface with reference to FIG. 4. Each of (a) to (d) of FIG. 4 shows an UI which is generated by the OSD generating section 106 and displayed by the LCD 110 in accordance with an operation instruction supplied by a user via a remote controller (not shown). The dotted pattern in the FIG. 4 indicates that an image indicated by an image signal which is supplied from the image processing circuit 108 is displayed in the dotted region.

When a user operates a remote controller so as to cause a menu screen to be displayed, a menu screen 140 as shown in (a) of FIG. 4 is displayed on the liquid crystal panel 110b.

The menu screen 140 includes various controls such as "color management—hue" for adjusting hue and "color management—saturation" for adjusting saturation. A user can select each of the controls by using up and down keys of the remote controller (see (a) of FIG. 4).

One of the controls is a slide bar for adjusting a "shutter effect" (hereinafter, referred to as a "slide bar for a shutter effect adjustment"). By operating the slide bar for shutter effect adjustment 132, a user can adjust lighting frequency of the backlight 110a in seven levels in total (in increments of 2 Hz) in a range from 48 Hz to 60 Hz. Note that "0" in FIG. 4 indicates that the lighting frequency is 60 Hz, whereas "6" indicates that the lighting frequency is 48 Hz. A default value of the slide bar for a shutter effect adjustment 132 is "6".

In a case where (i) the slide bar for a shutter effect adjustment 132 is selected from the menu screen 140 via remote control operation and (ii) a decision button of the remote controller is pressed while the telecine-converted image detection circuit 1081 is detecting a telecine-converted interlaced image signal, only the slide bar for a shutter effect adjustment 132 is displayed in the liquid crystal panel 110b. In a case where the decision button of the remote controller is pressed again in this state, the slide bar for a shutter effect adjustment 132 moves downward (see (c) of FIG. 4). The CPU 118 thus accepts an instruction to adjust a shutter effect via left and right keys of the remote controller. Specifically, in a case where the CPU 118 detects that the slide bar for a shutter effect adjustment 132' has been adjusted to i, the CPU 118 causes the backlight control circuit 110c to control lighting frequency of the backlight 110a to be (60−2×i) Hz.

On the other hand, in a case where (i) the slide bar for a shutter effect adjustment 132 is selected from the menu screen 140 via remote control operation (ii) and the decision button of the remote controller is pressed while the telecine-converted image detection circuit 1081 is detecting a interlaced image signal which has not been subjected to a telecine conversion, a UI shown in (d) of FIG. 4 is displayed. That is, in a case where an image being displayed on the liquid crystal panel 110b is not a film image, lighting frequency of the backlight 110a is not changed even if the slide bar for a shutter effect adjustment is operated.

Specific Example 2

Figure 5:
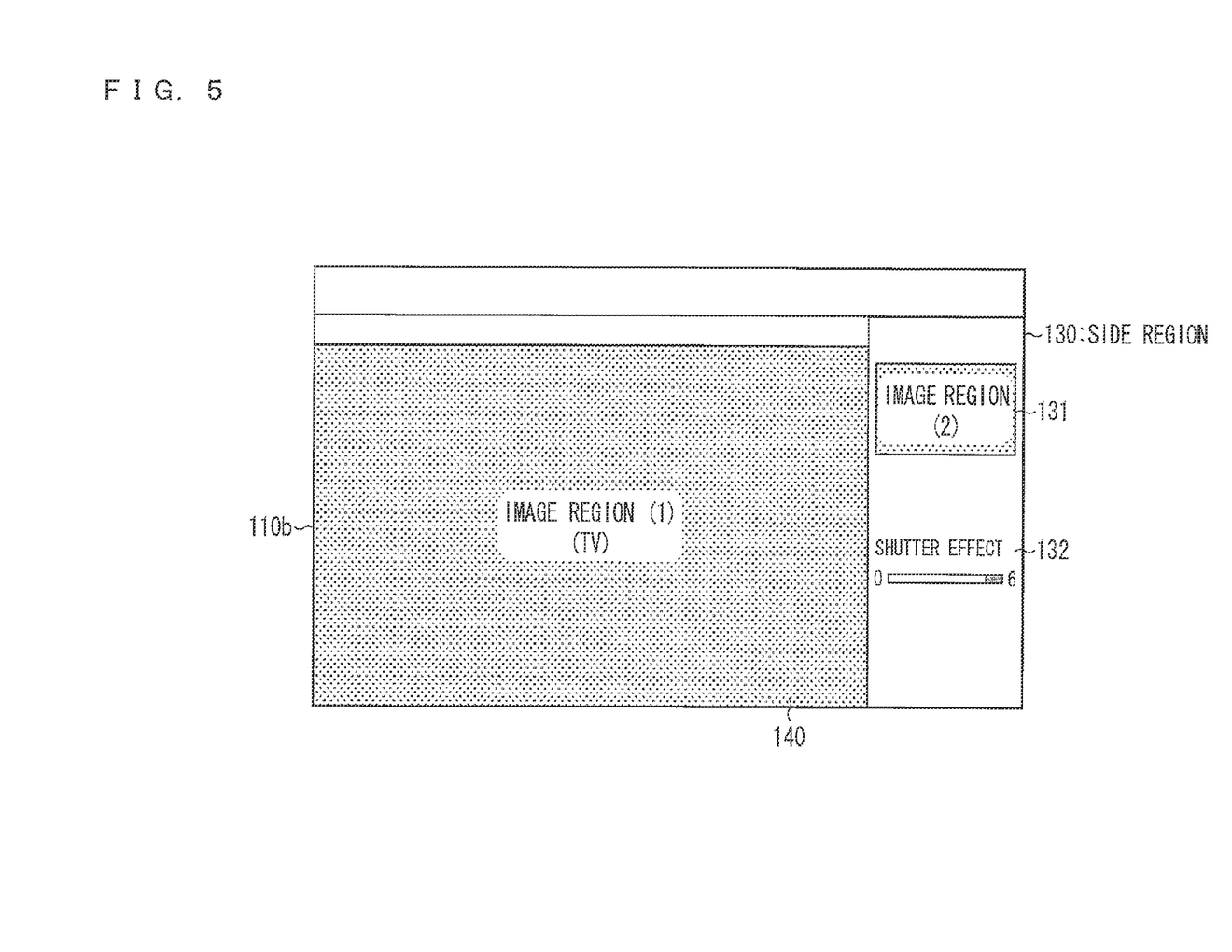
FIG. 5 shows another example of the screen on which lighting frequency of a backlight is adjusted in a movie (classic) mode.

Next, the following description discusses Specific Example 2 of the user interface with reference to FIG. 5. FIG. 5 shows an UI which is displayed by the LCD 110 in accordance with an operation instruction given by a user via a remote controller (not shown). The dotted pattern in the FIG.

5 indicates that an image indicated by an image signal which is supplied from the image processing circuit 108 is displayed in a dotted region.

When a user operates a remote controller so as to cause a menu screen to be displayed, a screen as shown in FIG. 5 is displayed on the liquid crystal panel 110b. The screen has two image regions (an image region 140, and an image region 131 in a side region 130) (see FIG. 5). In the side region 130, a slide bar for a shutter effect adjustment 132 is also displayed which is identical to the slide bar for a shutter effect adjustment 132 discussed in Specific Example 1.

When the CPU 118 detects that a setting value of the slide bar for a shutter effect adjustment 132 has been adjusted to i, the CPU 118 controls the backlight control circuit 110c as follows. Specifically, under control of the CPU 118, the backlight control circuit 110c controls the lighting frequency of the backlight 110a to become (60−2×i) Hz behind the image region 131 while maintaining the lighting frequency of the backlight 110a behind a region other than the image region 131. Note that the control by the backlight control circuit 110c is realized by an area drive circuit (not shown).

When the CPU 118 detects that the decision button is pressed in a state where a setting value of the slide bar for a shutter effect adjustment 132 has been adjusted to i, the CPU 118 (i) causes the backlight control circuit 110c to control the backlight 110a so that lighting frequency of the whole backlight 110a becomes (60−2×i) Hz and (ii) controls the liquid crystal panel 110b so that an image being displayed in the image region 140 is displayed in the whole region of the liquid crystal panel 110b.

Note that, in both in Specific Examples 1 and 2, the backlight control circuit 110c controls the backlight 110a to turn on and turn off for an identical period of time regardless of a setting value of the slide bar for a shutter effect adjustment 132.

As described above, according to the present embodiment, the backlight control circuit 110c controls lighting frequency of the backlight 110a in seven levels in total (in increments of 2 Hz) in a range from 48 Hz to 60 Hz. However, the present invention is not limited to this. That is, it is possible to employ an arrangement in which lighting frequency of the backlight 110a can be controlled in n levels in total (e.g., 31 levels in increments of 1 Hz) within any frequency range (e.g., from 40 Hz to 70 Hz). In other words, it is possible to employ an arrangement in which the CPU 118 sets a light-emitting period and a non-light-emitting period both of which are identical in length to be at any length specified by a user within a range including 1÷(m×n) seconds.

(Advantage of Liquid Crystal Television 1)

As described above, the liquid crystal television 1 which is capable of displaying an image of 24 frames per second carries out control, in the movie (classic) mode, with respect to the backlight 110a so that (i) a period which lasts for 1/96 second and during which the backlight 110a turns on alternates with (ii) a period which lasts for 1/96 second and during which the backlight 110a turns off. This allows a user viewing an image which is displayed on the liquid crystal television 1 to perceive a flicker of an image which flicker is unique to an old film.

The following description discusses other characteristics of an image which is displayed on the liquid crystal television 1.

In the movie (classic) mode, an image displayed on the liquid crystal television 1 is subjected to a super resolution process but is not subjected to a noise reduction process. Therefore, in a case where an old famous movie which contains grain noise etc. is played, such grain noise is more faithfully reproduced as compared with the case of the normal movie mode (that is, a case where an image is not subjected to a super resolution process but is subjected to a noise reduction process).

In addition, in the movie (classic) mode, an image displayed on the liquid crystal television 1 is an image which has been subjected to the edge enhancement process. Therefore, a definition unique to an old famous film is reproduced on the displayed image.

Furthermore, in the movie (classic) mode, an image which is displayed on the liquid crystal television 1 is an image which has not been subjected to a film dejudder process. This allows a user who views an image displayed on the liquid crystal television 1 to experience a feel of frame-by-frame playback which is unique to an old film.

For the above reasons, the liquid crystal television 1 is capable of reproducing an atmosphere created by an image of an old famous movie more faithfully than conventional televisions such as conventional liquid crystal televisions and conventional plasma televisions.

<Additional Remarks>

Note that the image processing circuit 108 may be arranged not to include at least one of the super-resolution processing circuit 1085 and the edge enhancement circuit 1086. That is, the liquid crystal television 1, in the movie (classic) mode, may display an image which has not been subjected to at least one of a super resolution process and an edge enhancement process.

The image processing circuit 108 may be arranged not to include the switching circuit 1082c (in this case, the CPU 118 supplies, in the movie (classic) mode, a control signal only to the switching circuit 1082b and the backlight control circuit 110c). That is, in a case where the image processing circuit 108 subjects a telecine-converted interlaced image signal to an image process, an image to be displayed on the liquid crystal television 1 is subjected to a film dejudder process even in the movie (classic) mode.

The image processing circuit 108 may be arranged such that the noise reduction circuit 1087 is provided at a subsequent stage to the edge enhancement circuit 1086 instead of being provided in parallel with the edge enhancement circuit 1086. That is, an image to be displayed on the liquid crystal television 1 can be subjected to a noise reduction process even in the movie (classic) mode.

According to the embodiment, the edge enhancement circuit 1086 carries out an edge enhancement process in order to obtain a definition unique to a film movie. Note, however, that it is also possible to obtain the definition unique to a film movie by providing the super-resolution processing circuit 1085 which carries out a super resolution process, instead of the edge enhancement circuit 1086, so that the super-resolution processing circuit 1085 is provided in a part of the liquid crystal television 1 where the edge enhancement circuit 1086 is provided.

The LCD 110 of the liquid crystal television 1 may be a general LCD in which three RGB sub pixels constitute one (1) pixel (that is, three primary colors may be used). Alternatively, the LCD 110 may be a LCD in which four sub pixels including RGB sub pixels and a yellow sub pixel or a cyan sub pixel constitute one (1) pixel (that is, four primary colors may be used) as in a case of a LCD disclosed in Japanese Patent Application "Tokugan, No. 2010-043103" which is not yet published as of filing of the present application. In a case where four primary colors are used, it is possible to obtain a definition unique to a film, especially, it is possible to make texture of skin deep and clear, by carrying out filter process at a sub pixel level which filter process is described in the Tokugan, No. 2010-043103.

Note that strictly speaking, according to the embodiment, "24 frames per second" means "23.976 frames per second" and "60 frames per second" means "59.95 frames per second". Moreover, it is unnecessary for the backlight control circuit 110c to control a light-emitting period and a non-light-emitting period to be exactly identical in length. It is only necessary that the light-emitting period and the non-light-emitting period be substantially identical in length.

The embodiment has dealt with an arrangement in which the backlight control circuit 110c controls the backlight 110a to alternately turn on and off. Note, however, the backlight control circuit 110c need not necessarily control the backlight 110a to completely turn off. That is, it is possible to employ an arrangement in which the backlight control circuit 110c controls the backlight 110a to alternate between (i) a normal light-emitting period in which the backlight 110a emits light at a normal luminance and (ii) a lower-light-emitting period in which the backlight 110a emits light at lower luminance than the normal luminance. Furthermore, an edge light type backlight may be employed instead of a direct type backlight 110a.

The present invention can be applicable also to a display device including a backlight scan section which controls a backlight by a backlight scan method.

According to the backlight scan method, a whole region of a liquid crystal panel is divided into a plurality of belt-shaped regions, and the backlight scan section controls each section of the backlight to turn on and turn off so that the plurality of belt-shaped regions are sequentially irradiated with light. In this case, only part of a backlight which part is controlled to turn on by the backlight scan section turns on in a light-emitting period set by a backlight control section.

Figure 6:
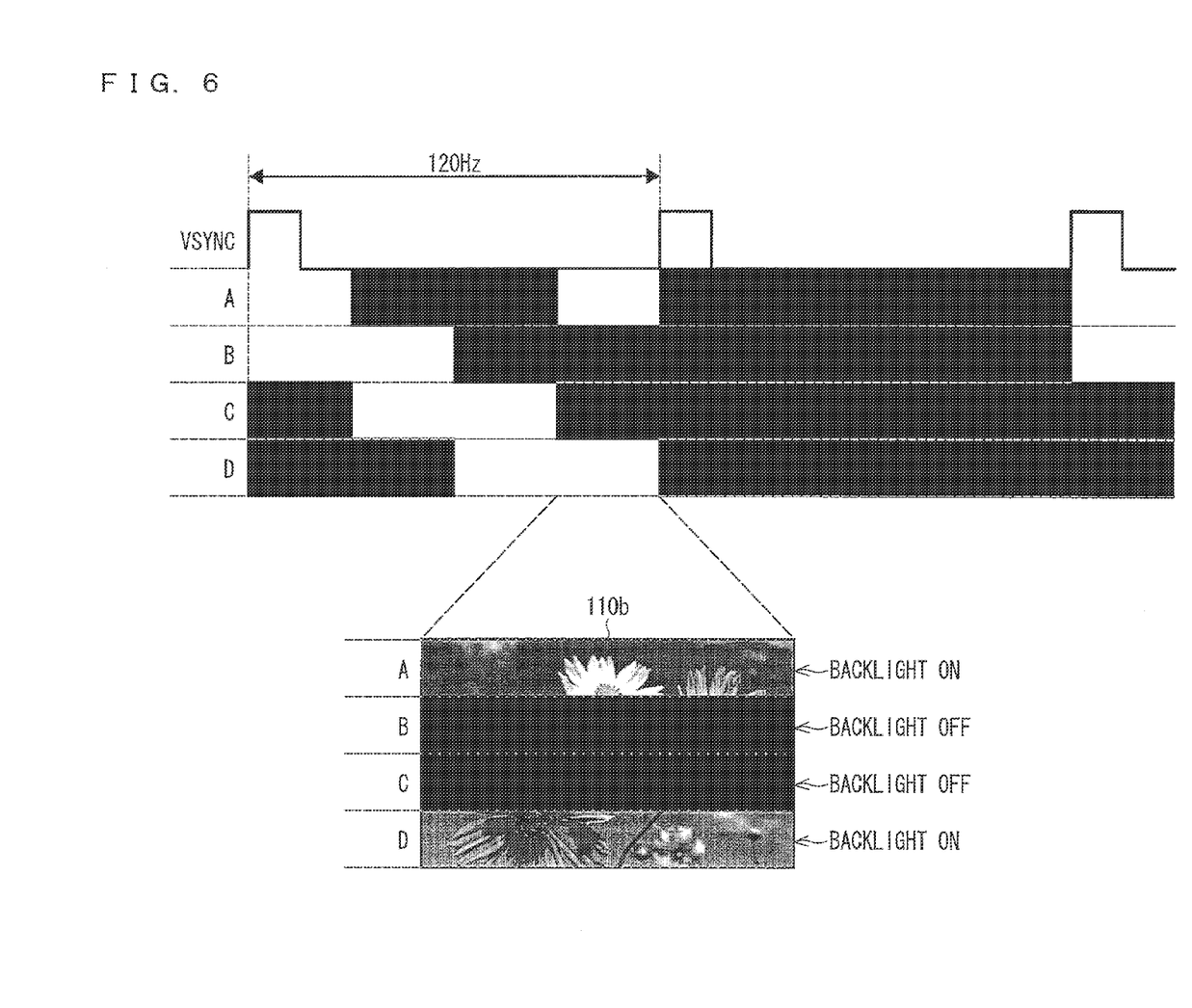
FIG. 6 is a timing chart which shows timings of controlling the backlight provided behind belt-shaped regions of a liquid crystal panel to turn on and off by use of a backlight scan technology, and an image which is displayed on the liquid crystal panel in a certain period of the timing chart.

With reference to FIG. 6, the following description discusses, by giving a specific example, timings of turning on and turning off a backlight provided behind the belt-shaped regions.

A timing chart shown in upper part of FIG. 6 shows timings when the backlight scan section controls the backlight provided behind the belt-shaped regions to turn on and turn off, in belt-shaped regions α to δ which are specific examples of the plurality of belt-shaped regions. In the timing chart, a black-colored part and a white colored part to the right of the symbol a indicate turning off and turning on, respectively. The same applies to the symbols β to δ. As is clear from FIG. 6, the timing chart is a schematic view showing a case where the backlight control circuit of the display device controls the backlight to turn on and off at a timing shown in (b) of FIG. 3.

The pulses shown on the right of the symbol VSYNC represent sync signals for turning on or turning off the backlight. That is, the timing chart shows three sync signals. In the timing chart, $1/120$ second between supply of a sync signal shown on the left and supply of a sync signal shown in the middle corresponds to a light-emitting period, whereas $1/120$ second between the supply of the sync signal shown in the middle and supply of a sync signal shown on the right corresponds to a non-light-emitting period.

As is clear from the timing chart of FIG. 6, the display device operates so that (i) a timing when the backlight scan section controls a part of the backlight which part is provided behind a specific one (the belt-shaped region a in FIG. 6) of a plurality of belt-shaped regions (the belt-shaped regions α to δ in FIG. 6) to turn on is in sync with (ii) a timing when the backlight control section controls the backlight to turn on (timing when a light-emitting period and a non-light-emitting period begin). That is, in the example shown in the timing chart of FIG. 6, in the first half period which lasts $1/120$ second, only specific parts of the backlight turn on for $1/480$ second in the order of (i) parts provided behind "the belt-shaped regions α and β", (ii) parts provided behind "the belt-shaped regions β and γ", (iii) parts provided behind "the belt-shaped regions γ and δ", and (iv) parts provided behind "the belt-shaped regions α and δ". In the latter half period which lasts $1/120$ second, the whole backlight turns off. For the last $1/480$ second of the first half period which lasts $1/120$ second, as image as shown in the lower part of FIG. 6 is displayed on the liquid crystal panel. Needless to say, $1/480$ second is such a short period that a viewer sees the image as if the image was displayed on the whole liquid crystal panel.

As mentioned above, the present invention yields an effect of reproducing an atmosphere created by an image of an old film movie even in a display device which displays a high-quality image by using a double speed drive technology and a back light scan technology.

The present invention is not limited to the description of the embodiments above, but may be altered by a skilled person within the scope of the claims. An embodiment based on a proper combination of technical means disclosed in different embodiments is encompassed in the technical scope of the present invention.

As described above, it is desirable that the display device in accordance with the present invention further includes an instruction receiving section which receives from a user an instruction to set an image quality of the image displayed on the display surface, only in a case where the instruction receiving section receives an instruction to set the image quality of the image at a designated image quality, the light source control section carrying out the control.

According to the arrangement, only in a case where a user gives an instruction to set an image quality of an image at a designated image quality, it is possible for the display device to reproduce an atmosphere created by an image of an old famous movie more faithfully than conventional televisions such as conventional liquid crystal televisions and conventional plasma televisions do.

That is, the display device reproduces an atmosphere created by an image of an old famous movie in a case where a user sets an image at a designated image quality, but does not reproduce the atmosphere created by an image of an the old famous movie in a case where the user set an image at an image quality other than the designated image quality.

According to this, the display device yields a further effect of displaying a suitable image in accordance with content for displaying the image.

It is desirable that the display device further includes a noise removing section which removes noise from an image signal for displaying an image on the display surface, the noise removing section not removing noise from the image signal in a case where the instruction receiving section receives the instruction to set the image quality of the image at the designated image quality.

According to the arrangement, in a case where a user gives the instruction to set the image quality of the image at the designated image quality, the display device does not remove noise from an image signal for displaying an image on the display surface. That is, in a case where an image displayed by the image signal contains noise such as grain noise, the noise is reproduced on an image to be displayed on the display surface.

Therefore, the display device yields a further effect of more faithfully reproducing an atmosphere created by an image of an old famous movie.

It is desirable that the display device further includes a super-resolution processing section which subjects the image signal to a supper-resolution process.

According to the arrangement, in a case where a user gives the instruction to set the image quality of the image at the designated image quality, an image displayed on the display surface is not only an image from which noise has not been removed but also an image which has been subjected to the supper resolution process. That is, noise is reproduced more clearly on the image displayed on the display surface.

Therefore, the display device yields a further effect of more faithfully reproducing an atmosphere created by an image of an old famous movie.

It is desirable that the display device further includes a dejudder section which subject an image signal for displaying an image on the display surface to a film dejudder process, the dejudder section not subjecting the image signal to the film dejudder process in a case where the instruction receiving section receives the instruction to set the image quality of the image at the designated image quality.

According to the arrangement, in a case where a user gives the instruction to set the image quality of the image at the designated image quality, the display device does not subject an image signal for displaying an image on the display surface to the film dejudder process even in a case where the image signal is a 24-frame image signal. This allows the image to be displayed on the display surface as if the image was played by frame-by-frame playback.

Therefore, the display device yields a further effect of more faithfully reproducing an atmosphere created by an image of an old famous movie.

It is desirable that the display device further includes an edge enhancement section which subjects an image signal for displaying an image on the display surface to an edge enhancement process.

According to the arrangement, an object is sharply outlined in the image which is displayed on the display surface.

According to this, it is possible for the display device to reproduce a definition unique to an old famous film. Therefore, the display device yields a further effect of more faithfully reproducing an atmosphere created by an image of an old famous movie.

It is desirable that the display device further includes setting means for setting a length of each of the light-emitting period and the non-light-emitting period at a length which is designated by a user within a range including $1 \div (m \times n)$ second.

The arrangement allows a user to adjust a flicker of an image. Therefore, the display device yields a further effect of showing a user who is watching a movie a suitable image in which the user can easily feel an atmosphere of a film movie.

Since lighting frequency of a fluorescent light varies from region to region (e.g., NTSC region: 60 Hz, PAL/SECAM region: 50 Hz), each region differs in suitable lighting frequency of a backlight at which lighting frequency a user can easily feel an atmosphere of a film movie. According to the arrangement, the display device yields a further effect of allowing a user to set a suitable light-emitting period and a non-light-emitting period with which the user can easily feel an atmosphere of a film movie, in accordance with a region in which the display device is used.

Note that it is desirable that a value of n is 24, and a value of m is 4.

According to the arrangement, the display device yields a further effect of more faithfully reproducing an image of a film movie of 24 frames per second.

Note that the value of n may be 60 and the value of m may be 2. Alternatively, the value of n may be 50 and the value of m may be 2.

According to the arrangement, it is possible for the display device to more clearly display 60-frame image which is employed by normal television broadcasting. That is, although the arrangement does not allow the display device to more faithfully reproduce an atmosphere created by an image of an old famous movie, the applicant found, in the course of attaining the present invention, that the arrangement yields the above effect.

INDUSTRIAL APPLICABILITY

The display device in accordance with the present invention is applicable to display devices in general such as a television.

REFERENCE SIGNS LIST

1 Television
11a to 11c HDMI input terminal
11d HDMI switch
100 HDMI receiver
101a Image input terminal
101b Sound input terminal
102 BD drive
103 Tuner
104 IP broadcasting tuner
105 Satellite broadcasting tuner
106 OSD generating section
107 Image selector
108 Image processing circuit
1081 Telecine-converted image detection circuit
1082a to 1082c Switching circuits
1083 IP converting circuit
1084 24-frame image restoration circuit
1085 Super-resolution processing circuit (Super-resolution processing section)
1086 Edge enhancement circuit (Edge enhancement section)
1087 Noise reduction circuit (Noise removing section)
1088 Film dejudder processing circuit (Dejudder section)
109 LCD controller
110 LCD
110a Backlight (Light source section)
110b Liquid crystal panel
110c Backlight control circuit (Light source control section)
111 Sound selector
112 Sound processing circuit
113 Digital amplifier
114 Speaker
115 Ethernet I/F
116 ROM
117 RAM
118 CPU (Setting means)
119 Infrared rays receiving section (Instruction receiving section)
120 Camera
121 Human sensor
122 Illumination sensor

The invention claimed is:
1. A display device which displays, on a display surface, an image of n frames per second, said display device comprising:

a light source section which emits light toward an outside of the display device so that the image is displayed on the display surface; and a light source control section which controls whether or not the light source section emits light, the light source control section carrying out control with respect to the light source section so that a light-emitting period in which the light source section emits light alternates with a non-light-emitting period in which the light source section does not emit light, in the light-emitting period, the light source control section controlling the light source section to sequentially irradiate a plurality of belt-shaped regions with the light in an order from an upper belt-shaped region to a lower belt-shaped region with an identical interval between timings at which respective adjacent ones of the plurality of belt-shaped regions are started to be irradiated with the light, wherein a sum of areas of belt-shaped regions that are simultaneously irradiated with the light is constant, the plurality of belt-shaped regions being regions into which a whole region of the display surface is divided, in the non-light emitting period, the light source control section controlling the light source section not to irradiate any one of the plurality of belt-shaped regions with light, the light-emitting period and the non-light-emitting period each being 1÷(m×n) second (m is an integer not less than 2)

said display device further comprising:

an instruction receiving section which receives from a user an instruction to set an image quality of the image displayed on the display surface; and a noise removing section which removes noise from an image signal for displaying an image on the display surface, only in a case where the instruction receiving section receives an instruction to set the image quality of the image at a designated image quality, the light source control section carrying out the control, and the noise removing section not removing noise from the image signal in a case where the instruction receiving section receives the instruction to set the image quality of the image at the designated image quality.

2. The display device as set forth in claim 1, further comprising a super-resolution processing section which subjects the image signal to a supper-resolution process.

3. The display device as set forth in claim 1, further comprising a dejudder section which subject an image signal for displaying an image on the display surface to a film dejudder process, the dejudder section not subjecting the image signal to the film dejudder process in a case where the instruction receiving section receives the instruction to set the image quality of the image at the designated image quality.

4. The display device as set forth in claim 1, further comprising an edge enhancement section which subjects an image signal for displaying an image on the display surface to an edge enhancement process.

5. The display device as set forth in claim 1, wherein:
a value of n is 24, and
a value of m is 4.

6. The display device as set forth in claim 1, wherein:
a value of n is 60, and
a value of m is 2.

7. The display device as set forth in claim 1, wherein:
a value of n is 50, and
a value of m is 2.

8. The display device as set forth in claim 1, further comprising setting means for setting a length of each of the light-emitting period and the non-light-emitting period at a length which is designated by a user within a range including 1÷(m×n) second.

9. A display method for a display device which displays, on a display surface, an image of n frames per second, said display method comprising the steps of:

(a) causing a light source section to emit light toward an outside of the display device so that the image is displayed on the display surface; and (b) causing a light source control section to control whether or not the light source section emits light, in the step (b), the light source control section carrying out control with respect to the light source section so that a light-emitting period in which the light source section emits light alternates with a non-light-emitting period in which the light source section does not emit light, in the light-emitting period of the step (b), the light source control section controlling the light source section to sequentially irradiate a plurality of belt-shaped regions with the light in an order from an upper belt-shaped region to a lower belt-shaped region with an identical interval between timings at which respective adjacent ones of the plurality of belt-shaped regions are started to be irradiated with the light, wherein a sum of areas of belt-shaped regions that are simultaneously irradiated with the light is constant, the plurality of belt-shaped regions being regions into which a whole region of the display surface is divided, in the non-light emitting period of the step (b), the light source control section controlling the light source section not to irradiate any one of the plurality of belt-shaped regions with light, the light-emitting period and the non-light-emitting period each being 1÷(m×n) second (m is an integer not less than 2), said display method further comprising:

(c) receiving from a user an instruction to set an image quality of the image displayed on the display surface; and (d) removing noise from an image signal for displaying an image on the display surface, the removing being not carried out in a case where the instruction received in the step (c) is an instruction to set the image quality of the image at a designated image quality, only in a case where the instruction to set the image quality of the image at the designated image quality is received in the step (c), the light source control section carrying out the control in the step (b).

10. The display device as set forth in claim 4, further comprising a dejudder section which subject an image signal for displaying an image on the display surface to a film dejudder process, the dejudder section not subjecting the image signal to the film dejudder process in a case where the instruction receiving section receives the instruction to set the image quality of the image at the designated image quality.

11. The display device as set forth in claim 2, further comprising a dejudder section which subject an image signal for displaying an image on the display surface to a film dejudder process, the dejudder section not subjecting the image signal to the film dejudder process in a case where the instruction receiving section receives the instruction to set the image quality of the image at the designated image quality.

12. The display device as set forth in claim 8, further comprising an edge enhancement section which subjects an image signal for displaying an image on the display surface to an edge enhancement process.

13. The display device as set forth in claim 2, further comprising an edge enhancement section which subjects an image signal for displaying an image on the display surface to an edge enhancement process.

14. The display device as set forth in claim 3, further comprising an edge enhancement section which subjects an image signal for displaying an image on the display surface to an edge enhancement process.

15. The display device as set forth in claim 4, wherein:
a value of n is 24, and
a value of m is 4.

16. The display device as set forth in claim 8, wherein:
a value of n is 24, and
a value of m is 4.

17. The display device as set forth in claim 2, wherein:
a value of n is 24, and
a value of m is 4.

18. The display device as set forth in claim 3, wherein:
a value of n is 24, and
a value of m is 4.

* * * * *